United States Patent
Doering et al.

(10) Patent No.: US 9,605,134 B2
(45) Date of Patent: Mar. 28, 2017

(54) POLYTETRAFLUOROETHENE COMPOUND WITH MICROSPHERES AND FIBERS

(71) Applicant: 3M INNOVATIVE PROPERTIES COMPANY, St. Paul, MN (US)

(72) Inventors: Marcel Doering, Rhede (DE); Robert Veenendaal, Klimmen (NL)

(73) Assignee: 3M INNOVATIVE PROPERTIES COMPANY, Saint Paul, MN (US)

( * ) Notice: Subject to any disclaimer, the term of this patent is extended or adjusted under 35 U.S.C. 154(b) by 77 days.

(21) Appl. No.: 14/374,579

(22) PCT Filed: Jan. 23, 2013

(86) PCT No.: PCT/US2013/022648
§ 371 (c)(1),
(2) Date: Jul. 25, 2014

(87) PCT Pub. No.: WO2013/112518
PCT Pub. Date: Aug. 1, 2013

(65) Prior Publication Data
US 2014/0378577 A1     Dec. 25, 2014

(30) Foreign Application Priority Data

Jan. 27, 2012    (EP) .................................... 12152785

(51) Int. Cl.
| | | |
|---|---|---|
| *C08J 3/20* | (2006.01) | |
| *C08K 7/20* | (2006.01) | |
| *C08K 7/04* | (2006.01) | |
| *C08K 7/14* | (2006.01) | |
| *C08K 3/22* | (2006.01) | |
| *C08K 3/36* | (2006.01) | |
| *C08K 3/40* | (2006.01) | |
| *C08K 7/24* | (2006.01) | |
| *C08K 7/06* | (2006.01) | |
| *C08K 7/08* | (2006.01) | |
| *C08K 7/10* | (2006.01) | |

(52) U.S. Cl.
CPC .................. *C08K 7/20* (2013.01); *C08K 3/22* (2013.01); *C08K 3/36* (2013.01); *C08K 3/40* (2013.01); *C08K 7/04* (2013.01); *C08K 7/06* (2013.01); *C08K 7/08* (2013.01); *C08K 7/10* (2013.01); *C08K 7/14* (2013.01); *C08K 7/24* (2013.01); *C08K 2003/2227* (2013.01)

(58) Field of Classification Search
CPC ... C08K 7/20; C08K 7/06; C08K 7/10; C08K 7/08; C08K 7/14
See application file for complete search history.

(56) References Cited

U.S. PATENT DOCUMENTS

| | | |
|---|---|---|
| 3,072,583 A | 1/1963 | Karl |
| 4,107,194 A | 8/1978 | Malhotra |
| 4,560,829 A | 12/1985 | Reed |
| 4,675,380 A | 6/1987 | Buckmaster |
| 4,743,658 A | 5/1988 | Imbalzano |
| 5,250,269 A | 10/1993 | Langer |
| 6,538,058 B2 | 3/2003 | Kobayashi |
| 2005/0137371 A1* | 6/2005 | Smith et al. .................. 526/247 |
| 2007/0015937 A1 | 1/2007 | Hintzer |

FOREIGN PATENT DOCUMENTS

| | | |
|---|---|---|
| CN | 102119452 A | 7/2011 |
| WO | WO 99-46028 | 9/1999 |

OTHER PUBLICATIONS

International Search Report for PCT International Application No. PCT/US2013/022648 mailed on Mar. 1, 2013, 3 pages.
http://multimedia.3m.com/mws/media/295767O/reflectivity-flyer.pdf, 3M Reflectivity, 2004.
http://www.virginiadot.org/business/resources/materials/mes_study_guides/bu-mat-pavemarkch2.pdf. Chapter 2 Reflective Glass Beads, vol. 1.0, pp. 1-19, 2012.

* cited by examiner

*Primary Examiner* — Hannah Pak
(74) *Attorney, Agent, or Firm* — C. Michael Geise

(57) ABSTRACT

A composition is provided that comprises a perfluorinated tetrafluoroethene polymer containing from 0 to 1.0% by weight of comonomers. The composition further comprises fibers containing inorganic oxides selected from silica or alumina and combinations thereof. Further, the composition comprises particles containing inorganic oxides selected from silica and alumina and combinations thereof. Also provided are methods of making such compositions and articles prepared from such compositions.

7 Claims, No Drawings

POLYTETRAFLUOROETHENE COMPOUND WITH MICROSPHERES AND FIBERS

FIELD

The present disclosure relates to fluoropolymer compositions comprising inorganic fillers, articles containing them and methods of making them. The fluoropolymers are tetrafluoroethene homo- or copolymers. The inorganic fillers are inorganic microspheres.

BACKGROUND

Fluoropolymers have found wide commercial application due to their chemical inertness, low friction and non-stick properties. Their high melting points allow for high service temperatures. These properties have made fluoropolymers the material of choice for making protective coatings and sealing materials in household applications as well as industrial applications, in particular in the automotive, aircraft, chemical and electronic industry.

Fluoropolymers are expensive raw materials. Therefore, fillers are often used in the preparation of fluoropolymer compositions or fluoropolymer articles to reduce the amount of fluoropolymer necessary to achieve the desired performance or to further improve the properties of the fluoropolymer composition or article.

There is a continuous need to provide further improved fluoropolymer compositions and articles using fillers.

SUMMARY

Therefore, in the following there is provided, in one aspect, a composition comprising (i) tetrafluoroethene polymer selected from tetrafluoroethene homopolymer and tetrafluoroethene copolymers containing from 0 to 1.0% by weight of comonomers other the tetrafluoroethene (based on the weight of the polymer);

(ii) fibers selected from carbon fibers, and fibers containing silicon nitrides, silicon carbides or inorganic oxides selected from silica or alumina, and combinations thereof;

(iii) particles containing inorganic oxides selected from silica and alumina and combinations thereof.

In another aspect there is provided a shaped article comprising the composition described herein. In yet another aspect there is provided a method of making a composition as described herein. In a further aspect there is provided the use of a composition as described herein for increasing the wear resistance of a shaped article.

DETAILED DESCRIPTION

Before any embodiments of this disclosure are explained in detail, it is to be understood that the disclosure is not limited in its application to the details of construction and the arrangement of components set forth in the following description. The invention is capable of other embodiments and of being practiced or of being carried out in various ways. Also, it is to be understood that the phraseology and terminology used herein is for the purpose of description and should not be regarded as limiting. Contrary to the use of "consisting", which is meant to be limiting, the use of "including," "containing", "comprising," or "having" and variations thereof is meant to be not limiting and to encompass the items listed thereafter as well as additional items. For example, a composition containing an ingredient A is meant to contain A or A and other ingredient. A composition consisting of A is meant to have ingredient A but no other ingredient. In both cases (limiting or non limiting meaning) equivalents are meant to be included.

The use of "a" or "an" is meant to encompass "one or more".

Any numerical range recited herein is intended to include all values from the lower value to the upper value of that range. For example, a concentration range of from 1% to 50% is intended to be an abbreviation and to expressly disclose the values between the 1% and 50%, such as, for example, 2%, 40%, 10%, 30%, 1.5%, 3.9% and so forth.

The term "perfluorinated" as used herein refers to a compound or residue whose hydrocarbons have been completely replaced by F atoms. For example, a —$CF_3$ residue is a perfluorinated methyl residue. A —$CHF_2$ residue, for example, would be a "partially fluorinated" compound, or more specifically a partially fluorinated methyl group. A perfluorinated compound may, however, in addition to C and F atoms also contain O atoms. These O atoms are ether functionalities and are also referred to as "catenary oxygen atoms" as they are part of a carbon chain and, more specifically, interrupting it. With respect to polymers the term "perfluorinated" is used to indicate that the polymers are obtained by using only perfluorinated momomers as monomers or co-monomers in the polymerisation. Such polymers, however, may contain non-fluorinated or partially fluorinated end groups, for example, through action of initiators, chain transfer agents or chain termination reactions and the like during the polymerisation or work up procedures.

Fluoropolymers

The fluoropolymers provided herein are homo- or copolymers of tetrafluoroethene (TFE). Tetrafluoroethene (TFE) homopolymers and TFE copolymers with up to 1% by weight of other perfluorinated monomers are called polytetrafluoroethylene (also referred to as polytetrafluoroethene or PTFE).

PTFE, typically has a very high molecular weight, typically about $10^6$ g/mole or greater. This high molecular weight leads to a very high melt viscosity (about $10^{10}$-$10^{13}$ Pa·s at 380° C.), which makes PTFE not accessible to melt processing like extrusion. PTFE is therefore "non melt-processable". The property of being "melt-processable" or not is generally determined by the melt flow index (MFI). The MFI measures the amount of polymer that can be pushed through a die at a specified temperature (here 372° C.) using a specified weight (here 5 kg). Thus, the MFI is a measure for the suitability for melt-processing a polymer. Non melt processable fluoropolymers have an MFI (372/5) of less than 0.1 g/10 min. Since they cannot be processed from the melt by ordinary melt-processing techniques like melt extrusion or injection molding, special processing techniques have to be used to make shaped PTFE articles. Such techniques include ram extrusion and compression molding typically followed by sintering to further fuse the particles. Typically, the PTFE particles obtained by the polymerisation are processed by these techniques to prepare blocks ("billets"), which are then sintered to further fuse the polymer particles. The sintered billets are then skived or machined into shaped articles. This somewhat cumbersome processing is offset by the good chemical and thermal resistance of the non-meltprocessable PTFE.

Due to its resistance to chemical and high thermal service temperatures, the non-melt processable PTFE is frequently used as gaskets and sealing materials in demanding applications, for example in the aircraft, motorcraft and water industry and in chemical engineering. In particular in applications where the PTFE material is subjected to frictional or other physical forces, good resistance against wear is required to increase the life-time of the PTFE material.

It has now been found that PTFE compositions containing the inorganic microspheres and inorganic fibres as described herein show an improved resistance to wear. They also show low deformation and good mechanical properties which allow the creation of shaped articles.

PTFE Compositions

The PTFE compositions provided herein contain PTFE, as described herein, the inorganic fibers and the inorganic particles as described herein.

The PTFE typically has a melting point within the range of 327+/−10° C.

The PTFE has the mechanical properties sufficient to prepare shaped articles. This means the PTFE has a tensile strength of at least 10 MPa or at least 20 MPa. The PTFE typically has an elongation at break of at least 20% or at least 100% or even at least 200%.

The PTFE compositions are solid at ambient conditions (25° C., 1 bar), and are referred to in the art as "compounds". "Compounds" as use here are solid compositions comprising one or more fluoropolymers as described herein and one or more fillers and optionally further additives. Typically, "compounds" may be shaped, for example, in the form of particles (like granules or pellets) or in the form of sheets.

The PTFE is perfluorinated. This means it only contains units derived from TFE or from TFE and one or more perfluorinated comonomers. Perfluorinated monomers include perfluorinated alpha-olefins (general formula $C_nF_{2n}$, with n being an integer of 2 to 10). A specific example is hexafluoropropylene (HFP). Other perfluorinated monomers include perfluorinated alkyl or allyl ethers (general formula $CF_2=CF-(CF_2)_n-O-Rf$, wherein n represents either 0 or 1 and Rf represents a linear or branched, cyclic or acyclic perfluorinated alkyl residue containing no, one or more than one catenary oxygen atom. Rf may contain up to 8, preferably, or up to 6 carbon atoms, such as 1, 2, 3, 4, 5 and 6 carbon atoms. Specific examples include but are not limited to perfluoroalkyl ethers (PAVE), like perfluoromethylether (PMVE) or perfluoropropylvinylether (PPVE).

PTFE is typically obtained by radical polymerisation initiated by a free radical initiator. The polymerisation is typically carried out in an aqueous phase. The polymerisation may be carried out as emulsion polymerisation or as suspension polymerisation.

Suspension polymerisations generally are carried out in an aqueous phase and in the absence of emulsifiers. In a suspension polymerisation the reaction mixture coagulates and settles as soon as stirring of the reaction mixture is discontinued. The resulting polymer particles are generally of bigger size than those obtained by emulsion polymerisation. Typically, the polymer particles obtained by emulsion polymerisations are in the range of 50 to 500 nm while the polymer particles with particle sizes of up to 800 μm may be obtained by suspension polymerisation. The particle size of the particles obtained after the polymerisation may be increased by agglomeration (for example adding hydrocarbons or other agglomerants to the particles) or decreased by milling. Since no fluorinated emulsifiers are used suspension PTFE is free of fluorinated emulsifiers, for example free of the fluorinated emulsifiers described below.

In aqueous emulsion polymerisation the polymerisation is carried out in a way that stable dispersions are obtained. The dispersions remain stable (no phase separation) after stirring of the reaction mixture has stopped for at least 2 hours, or at least 12 hours or at least 24 hours. Typically, fluorinated emulsifiers are employed in the aqueous emulsion polymerisation. The fluorinated emulsifier is typically used in an amount of 0.01% by weight to 1% by weight based on solids (polymer content) to be achieved. Suitable emulsifiers include any fluorinated emulsifier commonly employed in aqueous emulsion polymerization.

Typical emulsifiers correspond to the general formula:

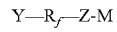

wherein Y represents hydrogen, Cl or F; $R_f$ represents a linear or branched perfluorinated alkylene having 4 to 10 carbon atoms; Z represents $COO^-$ or $SO_3^-$ and M represents a cation like an alkali metal ion, an ammonium ion or $H^+$. Exemplary emulsifiers include: ammonium salts of perfluorinated alkanoic acids, such as perfluorooctanoic acid and perfluorooctane sulphonic acid.

More recently emulsifiers of the general formula $[R_f-O-L-COO^-]_iX_i^+$ have been used wherein L represents a linear or branched partially or fully fluorinated alkylene group or an aliphatic hydrocarbon group, $R_f$ represents a linear or branched, partially or fully fluorinated aliphatic group or a linear or branched partially or fully fluorinated group interrupted with one or more oxygen atoms, $X_i^+$ represents a cation having the valence i and i is 1, 2 and 3. In case the emulsifier contains a partially fluorinated aliphatic group, it is referred to as a partially fluorinated emulsifier. Preferably, the molecular weight of the emulsifier is less than 1,000 g/mole. Specific examples are described in, for example, US Pat. Publ. 2007/0015937 (Hintzer et al.).

Preferably the PTFE used in the PTFE composition provided herein is in granular form and is referred to as "granular PTFE". The granules may have particles having a size (i.e. diameter or length) of from about 5 to about 800 μm. Preferably the particles have an average particle size of about 5 to about 800 μm, more preferably from about 10 to 500 μm and more preferably from about 12 to 51 μm (which can be determined by sieving and expressed as D50 value where 50 vol % of the particles are retained by a sieve having the respective mesh size.

Preferably the PTFE used, for example the granular PTFE, is "suspension PTFE", i.e. PTFE obtained by suspension polymerisation.

The PTFE described herein is commercially available for example from DuPont de Nemours & Company (DuPont), Solvay Solexis S.p.a. and 3M Company. Examples of suitable granular-grade PTFE include granular free-flow PTFE, granular semi-free flow PTFE, granular non-free-flow (standard-flow) PTFE, derivatives thereof, and combinations thereof. Commercially available examples of suitable granular-grade PTFE include trade designated DYNEON TF 1620 PTFE, DYNEON TF 1641 PTFE, DYNEON TF 1645 PTFE, DYNEON TF 1750 PTFE, DYNEON TEM 1600 PTFE, DYNEON TEM 1700 PTFE, DYNEON TEM 1705 PTFE, DYNEON TFM X 1630 PTFE, DYNEON TFR 1105 PTFE, and DYNEON TFR 1502 PTFE, all of which are available from 3M Company, St. Paul, Minn., U.S.A.

Inorganic Particles:

Inorganic particles useful in the composition according to the present disclosure are particles containing inorganic materials. Examples of inorganic materials include but are not limited to silica and alumina (i.e. silicon oxides, aluminium oxides) and combinations thereof or mixed oxides like but not limited to aluminosilicates like for example glass and ceramics. The particles may be solid or hollow. Preferably, the particles are hollow (or gas-filled, which means filled with a gas other than air). Preferably, the particles are of low density, for example a density of 0.9 g/cm³ or lower, for example a density between 0.1 to 0.9 g/cm³, or between about 0.6 and 0.8 g/cm³. The density can be determined (according to ASTM D-2840-69) by weighing a sample of the particles and determining the volume of the sample with an air comparison pycnometer (such as a ACCUPYC 1330 Pycnomether or a Beckman Model 930) or simply by displacement of water. The particles may be hollow or solid. Preferably the particles are hollow to reduce their density. The particles may be of spherical or approximately spherical shape (microspheres). Preferably, the particles are hollow microspheres, more preferably hollow glass microspheres (available under the trade designation GLASS BUBBLES from 3M Company, St. Paul USA. Useful inorganic particles, may have a diameter or a length ranging from 8 µm to 70 µm. The average particle size of the particles may be from about 8 µm to about 70 µm (D50 value, determined by sieving. The D50 value is the value at which 50 vol % of the particles are retained by a sieve with the respective mesh size). The particles preferably have a crush strength in excess of the anticipated pressures that may rise during manufacturing of articles. Examples of suitable average crush strengths for the inorganic particles include at least about 40 megapascals (MPa), or at least about 69 MPa (10.000 psi), or even at least about 117 MPa (17.000 psi) or even at least about 190 MPa (28.000 psi). Average crush strengths can be measured, for example, according to ASTM D3102-72, with the exception that the sample size of the particles is 10 milliliters, the particles are dispersed in 20.6 grams of glycerol, and the data reduction is automated using computer software. The value reported is the hydrostatic pressure at which 20% by volume of the particles collapse (i.e., 80% survival).

The particles also desirably exhibit good average crush strength-to-density ratios. The average crush strength-to-density ratio of the particles can be calculated by dividing the average crush strength of the low-density microspheres by the density of the particles. The average crush strength can be measured pursuant to ASTM D3102-72 with the exceptions discussed above. Examples of suitable average crush strength-to-density ratios for the particles include at least 100 MPa-cm³/g, preferably at least 200 MPa-cm³/g, more preferably at least 300 MPa-cm³/g.

Examples of particularly suitable inorganic particles include glass particles, for example microspheres commercially available from 3M Corporation, St. Paul, Minn., USA, under the trade designations 3M GLASS BUBBLES S60 microspheres, having a density of 0.6 g/cm³, an average crush strength of about 69 MPa (10.000 psi) and an average crush strength-to-density ratio of about 115 MPa-cm³/g; 3M GLASS BUBBLES S60HS microspheres, having a density of about 0.6 g/cm³, an average crush strength of about 124 MPa (18.000 psi) and an average crush strength-to-density ratio of about 207 MPa-cm³/g; 3M GLASS BUBBLES K42HS, having a density of 0.42 g/cm³, an average crush strength of about 51 MPa and an average crush strength-to-density ratio of about 121 MPa-cm³/g; and 3M iM30K Hi-Strength GLASS BUBBLES, having a density of 0.6 g/cm³, an average crush strength of about 191 MPa (28.000 psi) and an average crush strength-to-density ratio of about 320 MPa-cm³/g.

The inorganic particles are preferably used in the PTFE composition according to the present disclosure in amounts up to about 35 wt. %, or up to about 20 wt. %. Typical amounts include from about 1 wt. % up to about 15 wt. %, like from about 1.5 wt. % to about 10.5 wt. % based on the combined weight of PTFE, inorganic particles and inorganic fibers.

Fibers:

Fibers may be organic or inorganic fibers. Preferably, the fibers contain inorganic material (inorganic fibers). Typical inorganic material includes alumina (aluminium oxides), silica (silicon oxides), silicon nitrides, silicon carbide and combinations thereof. Another example of inorganic fibers are carbon fibers. These inorganic materials may be used singly, or at least two of them may be mixed and used in combination. For example, the inorganic fiber material may comprise alumina alone, or another inorganic material may further be used in combination with alumina, such as silica. Such fibers are referred to as alumina-silica fibers. Fibers containing a combination of silica, alumina and boron are referred to as aluminoborosilicate fibers.

The fiber materials may contain further metals such as sodium, potassium, calcium, magnesium, boron, titanium and zirconium and in particular their oxides.

Typically, inorganic fibers include ceramic fibers, glass fibers, and polycrystalline inorganic fibers.

The inorganic fibers may be used either individually or in combination of two or more kinds.

Specific examples of particular inorganic fibers include but are not limited to high alumina fibers comprising aluminum oxide in the range from about 67 to about 98 percent by weight and silicon oxide in the range from about 33 to about 2 percent by weight. These fibers are commercially available, for example, under the trade designation "NEXTEL 550" from the 3M Company, "SAFFIL" available from Dyson Group PLC, Sheffield, UK, "MAFTEC" available from Mitsubishi Chemical Corp., Tokyo, Japan) "FIBERMAX" from Unifrax, Niagara Falls, N.Y., and "ALTRA" from Rath GmbH, Germany. Further suitable inorganic fibers include but are not limited to aluminoboro silicate fibers, for example comprising aluminum oxide in the range from about 55 to about 75 percent by weight, silicon oxide in the range from less than about 45 to greater than zero (preferably, less than 44 to greater than zero) percent by weight, and boron oxide in the range from less than 25 to greater than zero (preferably, about 1 to about 5) percent by weight (calculated on a theoretical oxide basis as $Al_2O_3$, $SiO_2$, and $B_2O_3$, respectively). Aluminoborosilicate fibers are commercially available, for example, under the trade designations "NEXTEL 312" and "NEXTEL 440" from the 3M Company.

The fibers may typically have a diameter between 1 and 26 micrometers, preferably greater than 5 µm. Typically, the fibers have a length that is greater than their diameter. In a preferred embodiment, the fibers have a diameter of from about 6 to 18 micrometers, more preferably the fibers have an average diameter of about 8 to 16 micrometers. Preferably, the fibers are free or essentially free of fibers having a diameter of less than 3 micrometers. Essentially free here means that the amount of such small diameter fibers is not more than 2% by weight, preferably not more than 1% by weight of the total weight of fibers in the ceramic fiber layer.

The fibers may be crystalline or polycrystalline fibers. The fibers may be heat treated fibers sometimes called annealed fibers. Annealed fibers may be obtained as disclosed in U.S. Pat. No. 5,250,269 (Langer) or WO 99/46028, published Sep. 16, 1999.

In another particular embodiment, the fibers used include magnesium aluminium silicate fibers. For example fibers having between 10% and 30% by weight of aluminium oxide, between 52 and 70% by weight of silicium oxide and between 1% and 12% of magnesium oxide. The weight percentages of the aforementioned oxides are based on the theoretical amount of $Al_2O_3$, $SiO_2$ and MgO. The magnesium aluminium silicate glass fiber may contain additional oxides. For example, additional oxides that may be present include sodium or potassium oxides, boron oxide and calcium oxide. Particular examples of magnesium aluminium silicate glass fibers include but are not limited to E-glass fibers which typically have a composition of about 54 wt % $SiO_2$, 14 wt % $Al_2O_3$, 10 wt % of $B_2O_3$, 19 wt % CaO, 3 wt % MgO and 1 wt % other oxides (such as $Na_2O$ and $K_2O$). Further useful examples include but are not limited to S and S-2 glass fibers which typically have a composition of about 65 wt % of $SiO_2$, 25 wt % of $Al_2O_3$ and 10 wt % of MgO and R-glass fibers which typically have a composition of 60 wt % of $SiO_2$, 25 wt % of $Al_2O_3$, 9 wt % of CaO and 6 wt % of MgO. E-glass, S-glass and S-2 glass are available, for example, from Owens Corning and/or Advanced Glassfiber Yarns LLC and R-glass is available from Saint-Gobain Vetrotex.

The fibers are preferably used in the PTFE composition according to the present disclosure amounts up to 15% by weight, preferably in amounts up to 10% by weight, like for example in amounts between 1.0 and 7.5 or between 1.6 and 6.3% by weight, based on the total weight of the composition or based on the combined weight of PTFE, the inorganic particles as described herein and the fibers described herein. The latter is preferred.

Additives

The compositions according to the present disclosure may also include additional materials in varying concentrations if desired to further improve some properties of the compositions. Suitable additives include for example pigments, antioxidants, UV stabilizing agents, reinforcing agents, fillers (organic and inorganic) other than the inorganic particles and fibers described above, and combinations thereof.

Method of Making PTFE Articles

The compositions according to the present disclosure may be made with blending techniques as known in the art. The PTFE, the microspheres and the inorganic fibers are solids at ambient temperatures and pressures. They may be compounded by suitable blending techniques for solids (such as for example, but not limited to, high speed mixers or high shear force blenders). After blending, the compositions may be further processed and shaped to form articles. Form-giving methods as used in PTFE processing may be used, for example compression molding, sintering, and subsequent machining (e.g., skiving). An example of a suitable compression molding process includes compacting the compositions into preformed dimensions with a compression mold, such as a hydraulic press. Suitable pressures for compression molding range from about 13.8 MPa (2.000 psi)) to about 82.7 MPa (12.000 psi). The compression pressure may be applied in one direction (i.e., automatic compression molding) or from all sides (i.e., isostatic compression molding).

The compacted composition may then be sintered by applying heat to consolidate the composition at a temperature above the crystalline melting point (initial melting point) of the PTFE. Examples of suitable sintering conditions include heating the compacted composition at a temperature of between 340° C. and 380° C., for example at about 365° C. Sintering of the composition may be carried out in the compression mold. Alternatively, the compositions may also be removed from the compression mold and placed in a sintering oven when subjected to the sintering step.

Compression molding followed by sintering may be used to form the final article, or may be used to form intermediary articles that undergo subsequent machining Examples of intermediary articles that may be formed include spheres, sheets and billets (i.e., cylinders) that may be subsequently skived (i.e., sliced and peeled) to form differently shaped articles, like O-rings, films and sheets.

The compositions according to the present disclosure may be used to form articles that are dimensionally stable and exhibit good compressive strengths by withstanding high levels of compressive forces as indicated, for example, by low deformation. The compositions provided herein also exhibit good tensile strengths to prevent or reduce tearing and puncturing. The compositions provided herein also have an increased wear resistance. This makes the compositions particularly suitable as gaskets or seals or as components thereof. Such gaskets or seals may be advantageously be used in dynamic application, i.e. as dynamic gaskets or seals. Dynamic seals or gaskets seal the junction between to surfaces (typically metal surfaces or plastic surfaces having similar mechanical rigidity than metals) of which at least one may be moving. The moving surface may exert frictional or other physical forces on the seal or gasket. The compositions are also resistant to hydrocarbon fumes and liquids, e.g. resistant to fuels for combustion engines or hydrocarbon-based lubricants.

Therefore, the compositions may form or may be part of an article (e.g. a seal) used in engine driven applications, like for example a motor vehicle. The compositions may be particularly useful in the manufacture of crankshafts, crankshaft seals, camshafts, camshaft seals, pistons, piston seals, cylinder receiving pistons including seals for such cylinders, bearings and housing for bearings and including seals for such housing. The compositions may form the entire article or may be present as a component of the article.

The compositions provided herein are typically PTFE compounds, i.e. solid compositions containing PTFE. The PTFE compounds typically do not melt or disintegrate at a temperature below 200° C. at ambient pressure (i.e. 1 bar). The PTFE compositions or compounds provided herein typically have one or more or all of the following properties:

(i) a density of less than 2.1, preferably less than 2.0. Typically the density is between 1.5 and 1.9, for example 1.8;

(ii) an elongation at break of at least 250%, preferably at least 350% or even at least 400% (ASTM D 4755-06), for example between 250 and 550%;

(iii) a tensile strength of at least 10 MPa, preferably at least 12 MPa, for example between 15 and 25 MPa;

(iv) a shore D hardness of at least 50, preferably at least 60, for example between 62 and 71;

(v) a permanent deformation of less than 3.5%, for example between 2.0 and 3.3%

(vi) a wear factor of less than $3*10^{-7}$ $mm^3$/Nm.

Typical embodiments of the compositions provided herein have a density between 1.7 and 2.0, e.g. 1.8 g/cm³, an elongation at break of more than 400%, a tensile strength of at least 15 MPa, a permanent deformation of less than 3% and a wear factor of less than $1*10^{-7}$ $mm^3$/Nm.

EXAMPLES

The following examples are provided to further illustrate the compositions and methods provided herein. These examples are provided to illustrate certain embodiments but are not meant to limit the invention thereto. Prior to that some test methods used to characterize materials and their properties will be described. Unless specified otherwise, percentages are percentages by weight with respect to the mass of the total compositions and add up in each case to 100 weight percent.

Test Methods

Hardness:

Hardness Shore D was measured according to DIN-53505. The results listed are the average values of 3 measurements.

Tensile Strength at Break, Elongation at Break:

These properties were determined using an INSTRON tester with a 0.5 KN load cell in accordance with ASTM D 4745-06. All tests were run at a constant cross head displacement rate of 50 mm/min. Each test was run 4 times. The values reported are averages of the 4 tests. Elongation at Break is reported in %. Tensile Strength at Break is reported in units of Mega Pascals (MPa).

Density:

Density was determined by water displacement (measuring the amount of water displaced by sample).

Deformation:

The deformation at room temperature was measured after 24 hrs, after 100 hours and after 124 hours (permanent deformation) according to ASTM D 621. The values reported are the averages of 3 samples and the values recorded are %.

Wear Factor and Friction Coefficient

The wear factor and friction coefficient were determined according to ASTM 3702: "Wear Rate and Coefficient of Friction in Self-Lubricated Rubbing Contact" using a Thrust Washer Machine. This test was done using a Lewis Wear Tester (Lewis Research Inc.), by holding a sample having a contact surface of 134.6 mm$^2$ against a 1018 stainless steel trust washer with a surface finish of 0.4μ at a constant contact pressure (0.69 MPa) and at a constant sliding speed (0.51 m/s) during 100 hours to measure both the dynamic coefficient of friction and the wear properties of the sample. The wear factor is expressed in mm$^3$/Nm. The lower the value the greater is the resistance of the material to wear.

Melting Point:

Melting points can be determined by DSC (a Perkin Elmer differential scanning calorimeter Pyris 1) according to ASTM D 4591. 5 mg samples are heated at a controlled rate of 10° C./min to a temperature of 380° C. by which the first melting temperature is recorded. The samples are then cooled at a rate of 10° C./min to a temperature of 300° C. and then reheated at 10° C./min to a temperature at 380° C. The melting point observed at the second heating period is recorded and is referred to herein as the melting point of the polymer (melting point of the once molten material). Polymers with a very high content of TFE-units tend to have different melting points when being molten for the first time and after being molten for the first time, in which case the melting point tends to be somewhat lower. However, once the material has been molten the melting point remains constant. When referred herein to a melting point the melting point of the once molten material is meant unless stated otherwise.

Melt Flow Index (MFI):

Melt flow index can be measured with a Gottfert melt indexer according to DIN EN ISO 1133 using a 5 kg load and a temperature of 372° C. (MFI 372/5). The extrusion time is one hour.

Materials Used and Abbreviations:

PTFE TFM 1700: granular PTFE (obtained by suspension polymerisation), having an average particle size of 25 μm, commercially available from 3M; St. Paul, Minn., U.S.A.

iM30K (GB): High strength glass bubbles (microspheres) having a density of 0.60 g/cm$^3$ and an average diameter of 18 μm commercially available from 3M, St. Paul, Minn., U.S.A.

E glass fiber (GF): low alkali glass (length 35 micron, diameter 13 micron) commercially available from Owens Corning Toledo, Ohio, U.S.A.

EXAMPLES

Examples 1 and 2 and Comparative Examples C-1 and C-2

Examples 1 and 2 and comparative examples C-1 and C-2 were made by blending PTFE TFM 1700 (granular PTFE obtained by suspension polymerisation) with glass bubbles (GB) and glass fibers (GF) in the amounts as indicated in table 1 by using a Lodige high speed mixer (Gebrüder Lödige Maschinenbau GmbH, Paderborn, Germany). (Due to the difference in density, the volume of 7.5 w % glass bubbles corresponds with the volume of 25 wt % glass fibers and therefore, comparative examples C-1 and C-2 contained about the same volume % of fluoropolymer).

The blends were compression moulded at 40 Mpa into billets with a diameter of 45 mm and 60 mm height and then slowly degassed. The obtained materials were sintered at 356° C. for 12 hours. The samples were then tested for their properties as given in table 1.

TABLE 1

Properties of PTFE compositions

| | Ex 1<br>PTFE + 7.5% wt<br>GB + 2.5% | Ex 2<br>PTFE + 7.5% GB +<br>5% GF | C-1<br>PTFE +<br>7.5% GB | C-2<br>PTFE +<br>25% GF |
|---|---|---|---|---|
| Density (g/cm$^3$) | 1.8 | 1.8 | 1.8 | 2.2 |
| Tensile strength at break (MPa) | 17.6 | 16.6 | 19.7 | 18.5 |
| Elongation at break (%) | 446 | 440 | 427 | 405 |
| Hardness (Shore D) | 67 | 68 | 68 | 67 |
| Deformation (24 hrs, %) | 5.9 | 6.4 | 7.4 | 7.6 |
| Deformation (100 hrs, %) | 6.2 | 6.9 | 7.8 | 8.2 |
| Deformation (permanent, %) | 2.7 | 2.9 | 3.5 | 3.9 |
| Helium permeation cm$^3$ * mm/d * m$^2$ * bar | 10.59 | 19.10 | 3.62 | 363.32 |
| Wear factor (mm$^3$/Nm) | $5.50 * 10^{-7}$ | $2.73 * 10^{-8}$ | $7.48 * 10^{-6}$ | $2.65 * 10^{-7}$ |
| Friction coefficient | 0.273 | 0.344 | 0.189 | 0.332 | amounts are % by weight based on total weight of composition with the ingredients above making up 100%.

Comparative Examples 3 and 4

The wear properties of PFA (without addition of inorganic particles and inorganic fibers was compared with the wear properties of the same PFA containing (3.6% wt of inorganic particles (IM30K). The PFA sample without addition of glass bubbles or fibers survived 100 hours in the test equipment and gave an average wear factor of 7.19 E-06. Adding glass bubbles to the PFA reduced the wear properties and the experiment had to be stopped after 70 hours due to high wear alarm.

Comparative Example 5

A PTFE sample without addition of inorganic particles or fibers was subjected to the wear test. The experiments had to be stopped because the high wear alarm was triggered already after 0.8 hours.
Melt-Processable Fluoropolymer Compositions with Inorganic Particles:

In another aspect the present disclosure relates to melt-processable fluoropolymer compositions, like FEP compositions (comonomers of TFE and HFP and optional further fluorinated, preferably perfluorinated polymers) and PFA compositions (copolymers of TFE and one or more perfluorinated vinyl or allyl ethers as described above for PTFE polymers). The melt-processable polymers have an MFI (372/5) of greater than 1.0 g/10 min, preferably greater than 5.0 g/10 min. The melt processable fluoropolymers are copolymers of TFE and one or more other comonomers, typically perfluorinated polymers and have a melting point of at least 200° C. and below 310° C., typically between 210° C. and 290° C. FEP compositions are preferred. FEP and PFA polymers typically contain more than 2% by weight and up to 12.0% by weight of comonomers. Contrary to PTFE, FEP and PFA can be easily processed by melt-extrusion. PFA and FEP's are good electrical insulators and are therefore typically used as insulating material for cables and wires. PFA and FEP compositions containing the inorganic microspheres as described herein may have increased electrically insulating properties like reduced dielectric constants or lower dissipation factors which make them suitable as insulating materials for cables and wires, in particular wires for high frequency application, like coaxial and twisted pair cables and other high-frequency transmission media or circuit components. The insulating properties can be improved by using foamed cables. For example, U.S. Pat. No. 4,560,829 discloses a coaxial cable in which the electrical insulation can be an FEP fluoropolymer that has been foamed using a foaming agent having the formula $C_nF_{2n+2}$. However, low molecular weight fluorocarbons have been associated with ozone depletion in the atmosphere.

Therefore, alternatives are desired which allow the manufacture of cables with improved high frequency transmission properties. Such cables may be provided by providing an insulator containing the melt-processable fluoropolymer composition comprising the inorganic particles as described herein. Particularly preferred are hollow particles. More preferred are hollow particles having a density between 0.6 and 0.9 g/cm³. The amount of such particles may be up to about 40 vol %, based on the total volume of the composition. Typically, the amount of inorganic particles may be between about 5 and about 30 vol %. The use of the particles may reduce the amount of foaming agents or may no longer require foaming of the cable to improve the electrical insulation properties. Therefore, in one embodiment, the present disclosure provides a cable containing a conductor, typically a metallic conductive element, and the insulator. The insulator typically contacts the conductor. The insulator contains the melt-processable fluoropolymer composition containing the inorganic particles. The melt processable fluoropolymer is preferably free of polar end groups, which means the polymer has been treated by postfluorination or heat treatment to remove unstable end groups like —COOH, —OH, and —COF end groups. Suitable fluorination processes are described in more detail in U.S. Pat. No. 4,743,658, the disclosure of which is incorporated herein by reference. A level of about 50 end groups other than —CF3 per million carbon atoms can be reasonably detected by infrared spectroscopy, as described in more detail in U.S. Pat. No. 4,675,380, the disclosure of which is incorporated herein by reference. Thus the polymer should have fewer than about 50 and preferably fewer than about 20 such groups per million carbon atoms.

For transmission of e.g. television signals, the frequency region of 100 MHz to 10 GHz is important. The melt-processable fluoropolymer compositions provided herein may reduce the dissipation factor at such higher frequencies.

The melt processable fluoropolymer compositions provided herein may have improved dissipation factors over a broad frequency range are useful as wire and cable coating compositions, and are particularly useful as insulation in coaxial cables, the construction of which is well known. A coaxial cable comprises a central conductive element or wire, usually of a metal such as copper. The central element is surrounded by an insulating medium, which in turn is surrounded by an outer conductive element, which may be, for example, a metallic foil, a woven or braided composite wire, or a drawn aluminum, copper, or other metallic tube. The outer conductive element can also be encased in further protective insulation. Coaxial cables can be prepared by melt extruding around a central conductor the FEP composition. Foaming agents may be added to make a foamable polymer composition and to make a "foamed" cable. The extrusion is in this conducted at a temperature sufficient to cause the foaming agent to expand after the polymer exits the extruder die, thus providing a foamed core insulation about the central conductor. In case where no foaming agent is used, the melt extrusion temperature is chosen in which the composition can be satisfyingly extruded. Thereafter one or more outer layers (conductive metallic layers or shields and further insulating layers, like an overall insulating jacket) may be placed around the fluoropolymer composition layer. Preparation of coaxial cables with foamed core insulation components is described in more detail in U.S. Pat. No. 3,072,583, the disclosure of which is incorporated herein by reference. The melt-processable fluoropolymer compositions provided herein are useful for preparing "twisted pairs" cables. These cables are similar to coaxial cables in that a central conductor is surrounded by low-loss insulation, except that a plurality, normally two, of such conductors are twisted together. There is optionally another conductor around the outside of the pair as a shield, as well as an overall insulating jacket.

For transmission of e.g. television signals, the frequency region of 100 MHz to 10 GHz is important. The melt processable compositions provided herein may reduce the dissipation factor of cables at such higher frequencies. Coaxial and twisted pair cables are suitable for a frequency region of 100 MHz to 10 GHz. Cables thus prepared using the specified polymer compositions as insulation may have improved electrical signal transmission properties, like for example reduced dielectric loss, and/or reduced dissipation factors.

The attenuation of a signal upon passage through a coaxial cable is the sum of a loss due to the conductor material itself and the attenuation due to the dielectric loss of the core insulation. At high frequencies, the dielectric loss comprises an increasingly important fraction of the total attenuation, so the importance of minimizing dielectric loss due to the insulator is apparent. Insulator dielectric loss is proportional to the following relationship $$L=0.092 \times F \times (DC)^{1/2} \times DF$$

where L is the dielectric loss in decibels per meter, F is the frequency in MHz, DC is the dielectric constant of the insulator, and DF is the dissipation factor. It is evident from this equation that insulation with a lower dissipation factor will provide cables with a lower overall dielectric loss, and this effect is more pronounced at higher frequencies. It is just at these higher frequencies, i.e., 100 MHz and above, that the polymers of the present embodiment may show the greatest improvement in dissipation factor. As a result, cables prepared from these melt processable compositions may show particularly improved transmission properties at high frequencies, like frequencies of from example 100 MHz to 10 GHZ.

A melt processable fluoropolymer composition can be prepared by mixing a commercial melt procesable fluoropolymer, e.g. an FEP or PFA polymer, with the inorganic particles, like the microspheres. The dissipation factor of the composition can be measured as a function of frequency on a plaque about 2.5 mm (0.1 inch) thick. The dissipation factor can be measured by one or more methods, depending on the frequency of interest. Such methods are well known to those skilled in the art. Measurement methods are also described in ASTM D 150 and ASTM D-2520. The polymer composition can be melt extruded onto a 2.8 mm (0.109 inch) diameter copper wire (for example using chlorodifluoromethane as the blowing agent and boron nitride as a nucleating agent), to form a (foamed layer) of insulation on the wire, for example, according to the teaching of U.S. Pat. No. 3,072,583.

The cable thus made may be shielded with aluminum foil in a manner known in the art. The total attenuation of the shielded cable can be measured at different frequencies by using a high-frequency network analyzer. The dielectric attenuation can be calculated from the total attenuation using the formula $$A=(0.435/Zo)(1/d+1/D)(F)^{1/2}+2.78P(K)^{1/2}F$$

where A is the total attenuation in decibels per 30.5 m (100 feet), the first term is the conductor attenuation, and the second term is the dielectric attenuation. Zo is the characteristic impedance, d is the diameter of the inner conductor and D is the outside diameter of the insulation layer both in units of 25.4 mm (inches), F is the frequency in megahertz, P is the power factor or dissipation factor, and K is the dielectric constant of the foam insulation.

LIST OF EMBODIMENTS

The following list of embodiment is provided to further illustrate some particular emodiments according to the present disclosure. This list is provided for illustrative purposes only and not meant to limit the disclosure to the embodiments contained in this list.

1. A composition comprising
   (i) tetrafluoroethene polymer selected from tetrafluoroethene homopolymer and tetrafluoroethene copolymers containing from 0 to 1.0% by weight of comonomers other the tetrafluoroethene (based on the weight of the polymer);
   (ii) fibers selected from carbon fibers, and fibers containing silicon nitrides, silicon carbides or inorganic oxides selected from silica or alumina, and combinations thereof;
   (iii) particles containing inorganic oxides selected from silica and alumina and combinations thereof.

2. The composition according to embodiment 1 wherein the tetrafluoroethene polymer has a melt flow index at 372° C. and 5 kg load (MIF 372/5) of less than 0.1 g/10 min.

3. The composition according to any one of the preceding embodiments wherein the tetrafluoroethene polymer has a melting point of 327° C.+/−10° C.

4. The composition according to any one of the preceding embodiments wherein the tetrafluoroethene polymer is obtained by suspension polymerisation.

5. The composition according to any one of the preceding embodiments having an elongation at break of at least 250, preferably at least 350% or even at least 400%, for example between 250 and 550%.

6. The composition according to any one of the preceding embodiments having a tensile strength at break of at least 10 Mpa, preferably at least 12 MPa, for example between 15 and 25 MPa.

7. The composition according to any one of the preceding embodiments having a wear coefficient of less than $3 \times 10^{-7}$ mm$^3$/Nm.

8. The composition according to any one of the preceding embodiments wherein the inorganic fibers are glass fibers, carbon fibers, silicon nitride fibers, silicon carbide fibers.

9. The composition according to any one of the preceding embodiments wherein the inorganic particles are hollow.

10. The composition according to any one of the preceding embodiments wherein the inorganic particles are glass particles.

11. The compositions according to any one of the preceding embodiments wherein the inorganic particles have a particle size (length or diameter) between about 5 μm and about 80 μm.

12. The compositions according to any one of the preceding embodiments wherein 50 vol %. of the particles have a particle size between about 5 μm and about 80 μm (D50 of 5 to 80 μm).

13. The composition according to any one of the preceding embodiments being a PTFE compound.

14. The composition according to any one of the preceding embodiments being a sintered composition.

15. The composition according to any one of the preceding embodiments being obtainable by the method according to any one of embodiments 22 to 25.

16. The composition according to any one of the preceding embodiments containing from about 1.5 to about 30% by weight of the inorganic particles based on the total weight of the composition.

17. The composition according to any one of the preceding embodiments containing from about 1 to 10% by weight of the fibers based on the total weight of the composition.

18. The composition according to any one of the preceding embodiments containing the same amount or a greater amount in weight of the inorganic particles than the fibers.

19. A shaped article comprising the composition according to any one of the preceding embodiments.

20. The article of embodiment 19 being a dynamic or static seal.

21. The article of embodiment 20 being a component of a motor vehicle.

22. A method of making a composition according to any one of embodiments 1 to 18 comprising combining
(i) the tetrafluoroethene polymer,
(ii) the fibers selected from carbon fibers, and fibers containing silicon nitrides, silicon carbides or inorganic oxides selected from silica or alumina, and combinations thereof;
(iii) the particles containing inorganic oxides selected from silica and alumina and combinations thereof; and subjecting them to temperature and/or pressure treatment to form a shaped composition, optionally followed by sintering.

23. The method according to embodiment 22 wherein the tetrafluoroethene polymer is in particulate form having a length or a diameter of from about 5 to 800 μm.

24. The method according to embodiment 22 wherein the tetrafluoroethene polymer is in particulate form having an average particle size wherein 50 vol % of the particles have a particle size from about 5 to 800 μm (D50 value).

25. The method of embodiments 22 to 24 wherein the composition is formed to a shaped composition by compression molding or ram extrusion 26. The method according to any one of embodiments 22 to 25 wherein the tetrafluoroethene polymer is suspension PTFE.

27. Use of a composition according to any one of embodiments 1 to 18 for increasing the wear resistance of a shaped article.

28. The use of embodiment 27 wherein the article is a seal, preferably a dynamic seal.

29. A cable comprising a conductor and an insulator, wherein the insulator comprises a composition comprising a tetrafluoroethene copolymer that is melt processable and inorganic containing inorganic oxides selected from silica and alumina and combinations thereof.

30. The cable according to embodiment 29 wherein the tetrafluoroethene copolymer has a melt flow index at 372° C. and 5 kg load (MIF 372/5) of greater than 5 g/10 min.

31. The cable according to any one of embodiments 29 and 30 wherein the tetrafluoroethylene copolymer has a melting point of between 250° C. and 305° C.

32. The cable according to any one of embodiments 29 to 31 wherein the inorganic particles are hollow.

33. The cable according to any one of embodiments 29 to 32 wherein the inorganic particles are glass particles.

34. The cable according to any one of embodiments 29 to 33 wherein the inorganic particles have a particle size (length or diameter) between 5 and 80 μm.

35. The cable according to any one of embodiments 29 to 34 wherein the cable is a coaxial cable or a twisted pair cable.

36. The cable according to any one of embodiments 29 to 35 wherein the cable is a high frequency cable for frequencies from 100 MHz to 10 GHz.

37. The cable according to any one of embodiments 29 to 36 wherein the inorganci particles are present in an amount from about 5 to 30% by weight based on the combined weight of the melt processable tetrafluoroethene copylmer and the inorganic particles.

The invention claimed is:

1. A composition comprising
(i) tetrafluoroethene polymer selected from the group consisting of tetrafluoroethene homopolymer and tetrafluoroethene copolymers containing from 0 to 1.0% by weight of comonomers based on the weight of the polymer, the comonomer selected from the group consisting of (i) a perfluorinated alpha-olefin having the general formula $C_nF_{2n}$, wherein n is an integer of 2 to 10, and (ii) a perfluorinated alkyl or allyl ether having the general formula $CF_2=CF-(CF_2)_n-O-R_f$, wherein n represents either 0 or 1 and $R_f$ represents a linear or branched, cyclic or acyclic perfluorinated alkyl residue having up to 8 carbon atoms;
(ii) fibers selected from the group consisting of carbon fibers, and fibers containing silicon nitrides, silicon carbides, or inorganic oxides selected from silica or alumina, and combinations thereof; and
(iii) hollow glass microspheres wherein 50 vol % of the hollow glass microspheres have a particle size between 5 μm and 80 μm.

2. The composition according to claim 1 wherein the tetrafluoroethene polymer has a melt flow index at 372° C. and 5 kg load (MIF 372/5) of less than 0.1 g/10 min.

3. The composition according to claim 1 wherein the tetrafluoroethene polymer has a melting point of 327° C.+/− 10° C.

4. The composition according to claim 1 wherein the tetrafluoroethene polymer is obtained by suspension polymerisation.

5. The composition according to claim 1 wherein the inorganic oxide fibers are glass fibers.

6. The composition according to claim 1 wherein the composition contains from 1.5% to 30% by weight of the hollow glass microspheres based on the total weight of the composition.

7. The composition according to claim 1 wherein the tetrafluoroethene polymer is the homopolymer.

* * * * *

UNITED STATES PATENT AND TRADEMARK OFFICE
CERTIFICATE OF CORRECTION

PATENT NO. : 9,605,134 B2
APPLICATION NO. : 14/374579
DATED : March 28, 2017
INVENTOR(S) : Marcel Doering It is certified that error appears in the above-identified patent and that said Letters Patent is hereby corrected as shown below:

In the Specification

Column 2
Line 24, Delete "momomers" and insert -- monomers --, therefor.

Column 4
Line 52, Delete "TEM 1600" and insert -- TFM 1600 --, therefor.
Line 53, Delete "TEM 1700" and insert -- TFM 1700 --, therefor.
Line 53, Delete "TEM 1705" and insert -- TFM 1705 --, therefor.

Column 5
Line 6, Delete "Pycnomether" and insert -- Pycnometer --, therefor.

Column 6
Line 33, Delete "aluminoboro silicate" and insert -- aluminoborosilicate --, therefor.
Line 40, Delete "Al$_2$O$_3$," and insert -- Al$_2$O$_3$, --, therefor.

Column 7
Line 66, After "machining" insert -- . --.

Column 8
Line(s) 35-40, Delete "PTFE. The PTFE compounds typically do not melt or disintegrate at a temperature below 200.degree. C. at ambient pressure (i.e. 1 bar). The PTFE compositions or compounds provided herein typically have one or more or all of the following properties:" and insert the same on Column 8, Line 34, as a continuation of the same paragraph.

Signed and Sealed this
Twenty-seventh Day of June, 2017

Joseph Matal
*Performing the Functions and Duties of the*
*Under Secretary of Commerce for Intellectual Property and*
*Director of the United States Patent and Trademark Office*

CERTIFICATE OF CORRECTION (continued)
U.S. Pat. No. 9,605,134 B2

Column 13
Line 59, Delete "emodiments" and insert -- embodiments --, therefor.

Column 15
Line 23, After "extrusion" insert -- . --.

Column 16
Line 8 (Approx.), Delete "inorganci" and insert -- inorganic --, therefor.
Line 10 (Approx.), Delete "copylmer" and insert -- copolymer --, therefor.